United States Patent
Lim (10) Patent No.: US 12,530,834 B2
(45) Date of Patent: Jan. 20, 2026

(54) RANDOM ACCESS OF SCENE DESCRIPTION IN ISO BASE MEDIA FILE FORMAT (ISOBMFF) FILES

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 18/148,931

(22) Filed: Dec. 30, 2022

(65) Prior Publication Data

US 2023/0222725 A1 Jul. 13, 2023

Related U.S. Application Data (60) Provisional application No. 63/298,361, filed on Jan. 11, 2022.

(51) Int. Cl.
*G06T 15/00* (2011.01)

(52) U.S. Cl.
CPC .................. *G06T 15/005* (2013.01)

(58) Field of Classification Search
CPC ............ G06T 15/005; H04N 21/23412; H04N 21/43072; H04N 21/44012; H04N 21/6131; H04N 21/816; H04N 21/85406; H04N 19/25; H04L 67/02
USPC .......................... 345/419, 458, 501; 386/328
See application file for complete search history.

(56) References Cited

U.S. PATENT DOCUMENTS

| | | | |
|---|---|---|---|
| 2009/0313293 A1* | 12/2009 | Setlur | G06F 40/143 709/236 |
| 2011/0267269 A1* | 11/2011 | Tardif | H04N 21/4112 345/158 |
| 2014/0193139 A1* | 7/2014 | Wang | H04N 19/597 386/328 |
| 2020/0389676 A1* | 12/2020 | Denoual | H04N 21/85406 |
| 2021/0099773 A1* | 4/2021 | Bouazizi | H04N 21/85406 |
| 2021/0105451 A1* | 4/2021 | Oyman | H04N 19/597 |
| 2021/0409818 A1* | 12/2021 | Bouazizi | H04N 21/84 |
| 2022/0335979 A1* | 10/2022 | Kondrad | H04N 21/8402 |
| 2023/0281923 A1* | 9/2023 | Gudumasu | H04N 19/597 345/419 |

OTHER PUBLICATIONS

ISO/IEC 23090-14, ISO/IEC JTC 1/SC 29/WG 03 N0421, "Information technology—Coded representation of immersive media—Part 14: Scene Description," 2021, 73 pages.
ISO/IEC 14496-12 ISO; ISO/IEC JTC 1/SC 29; "Information technology—Coding of audio-visual objects: Part 12: ISO base media file format," 2021, 262 pages.

\* cited by examiner

*Primary Examiner* — Prabodh M Dharia (57) ABSTRACT

An apparatus includes a memory and a processor operably coupled to the memory. The processor is configured to identify a file track carrying scene description data. The processor is also configured to identify a subsequent sync sample in the file track after an initial sync sample. The processor is further configured to process the subsequent sync sample as a non-sync sample scene update.

17 Claims, 7 Drawing Sheets

RANDOM ACCESS OF SCENE DESCRIPTION IN ISO BASE MEDIA FILE FORMAT (ISOBMFF) FILES

CROSS-REFERENCE TO RELATED APPLICATION AND PRIORITY CLAIM

This application claims priority under 35 U.S.C. § 119(e) to U.S. Provisional Patent Application No. 63/298,361 filed on Jan. 11, 2022, which is hereby incorporated by reference in its entirety.

TECHNICAL FIELD

This disclosure relates generally to multimedia devices and processes. More specifically, this disclosure relates to random access of scene description in International Organization for Standardization (ISO)-based media file format (ISOBMFF) files.

BACKGROUND

ISO/IEC 23090-14 Scene Description for MPEG Media indicates that a graphics language transmission format (glTF) JavaScript object notation (JSON) documents are marked as sync samples and potential usage of redundant samples for random access, but it does not provide detailed descriptions on how to process such samples for random access.

SUMMARY

This disclosure provides devices and methods for random access of scene description in ISOBMFF files.

In a first embodiment, an apparatus includes a memory and a processor operably coupled to the memory. The processor is configured to identify a file track carrying scene description data. The processor is also configured to identify a subsequent sync sample in the file track after an initial sync sample. The processor is further configured to process the subsequent sync sample as a non-sync sample scene update.

In a second embodiment, a method includes identifying a file track carrying scene description data. The method also includes identifying sync samples in the file track after an initial sync sample. The method further includes processing the subsequent sync sample as a non-sync sample scene update.

In a third embodiment, an apparatus includes a memory and a processor operably coupled to the memory. The processor is configured to identify scene description data. The processor is also configured to generate a subsequent sync sample for a file track after an initial sync sample, wherein the subsequent sync sample is generated as a non-sync sample scene update. The processor is further configured to output the file track carrying the scene description data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

5G enables setting up application services closer to the end user using edge computing architectures. When there is a need for relocation (e.g., when user moves to a different location, fault tolerance, etc.), the application services that were serving the user have to be relocated as well. This application covers the aspects of application service relocation for 5G multimedia edge services.

For traditional audio-visual media data, sync samples are simply considered as random access points. Processing of sync samples is the same for a decoder playing an initial sync sample as a first sample as a decoder playing a sync sample subsequent to the initial sync sample. When a sync sample of traditional audio-visual media data is processed, the result of previously processed samples does not have to be preserved as they are not used for decoding of a subsequent sync sample and a decoder is fully refreshed regardless of the status of the decoder before processing a sync sample. This processing model cannot be simply applied to the processing of a sync sample of scene description data as the status of presentation engine should not be fully refreshed and the status of the presentation engine before processing a sync sample needs to be preserved for efficient processing. Therefore, an appropriate processing model of sync sample of scene description is provided.

TABLE 1

COMPARISON OF CHARACTERISTICS OF SYNC SAMPLES

| characteristics of sync samples | traditional audio-visual media | scene description data |
|---|---|---|
| dependency to the previous samples | No | No |
| continuity of the decoder status | No | Yes |

As shown in the Table 1, characteristics of a sync sample of traditional audio-visual data and scene description data are different. For traditional audio-visual media, sync samples are not dependent to the previous samples and continuity of the data from the previous sample does not exist. However, for scene description data, sync samples are not dependent to the previous samples but continuity of the data from the previous sample may exist.

Figure 1:
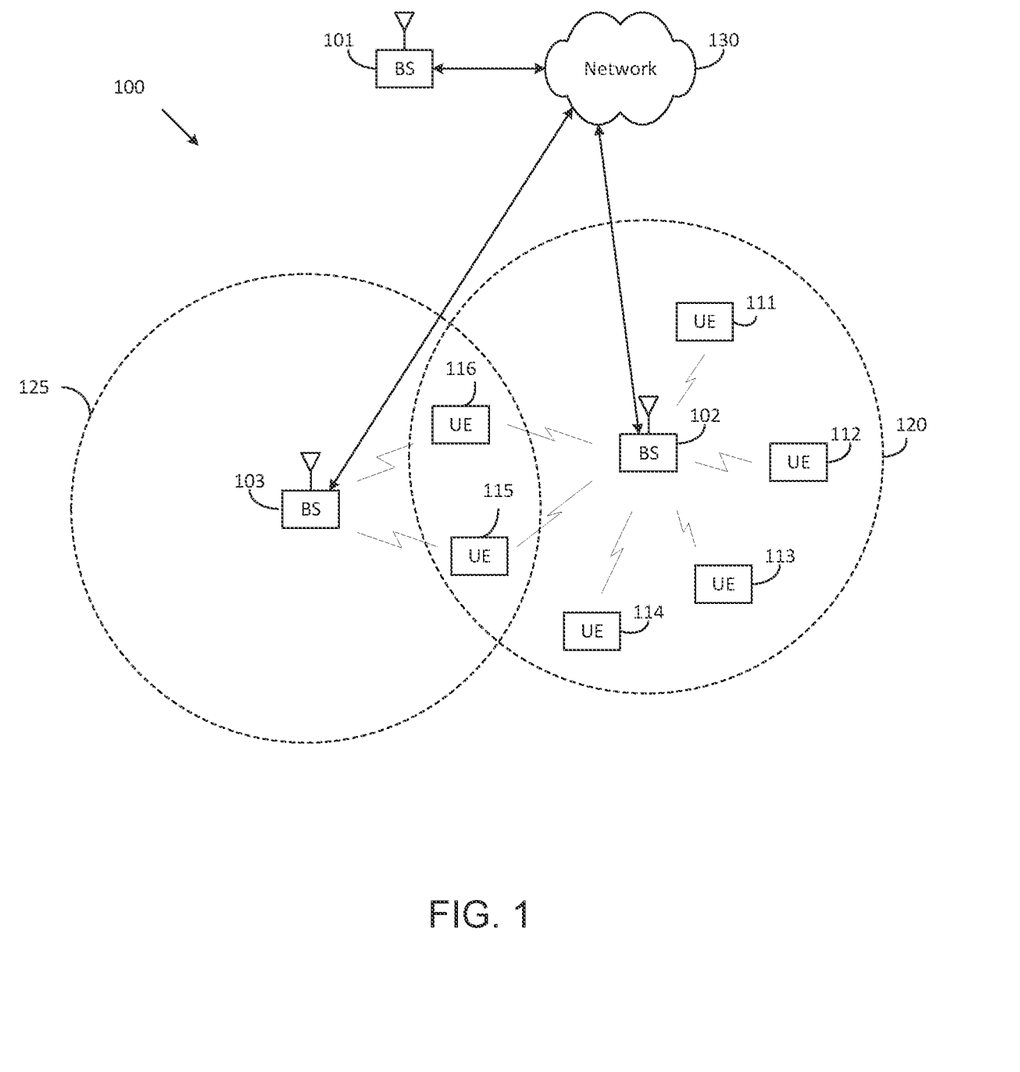
FIG. 1 illustrates an example communication system in accordance with an embodiment of this disclosure.
Figure 2:
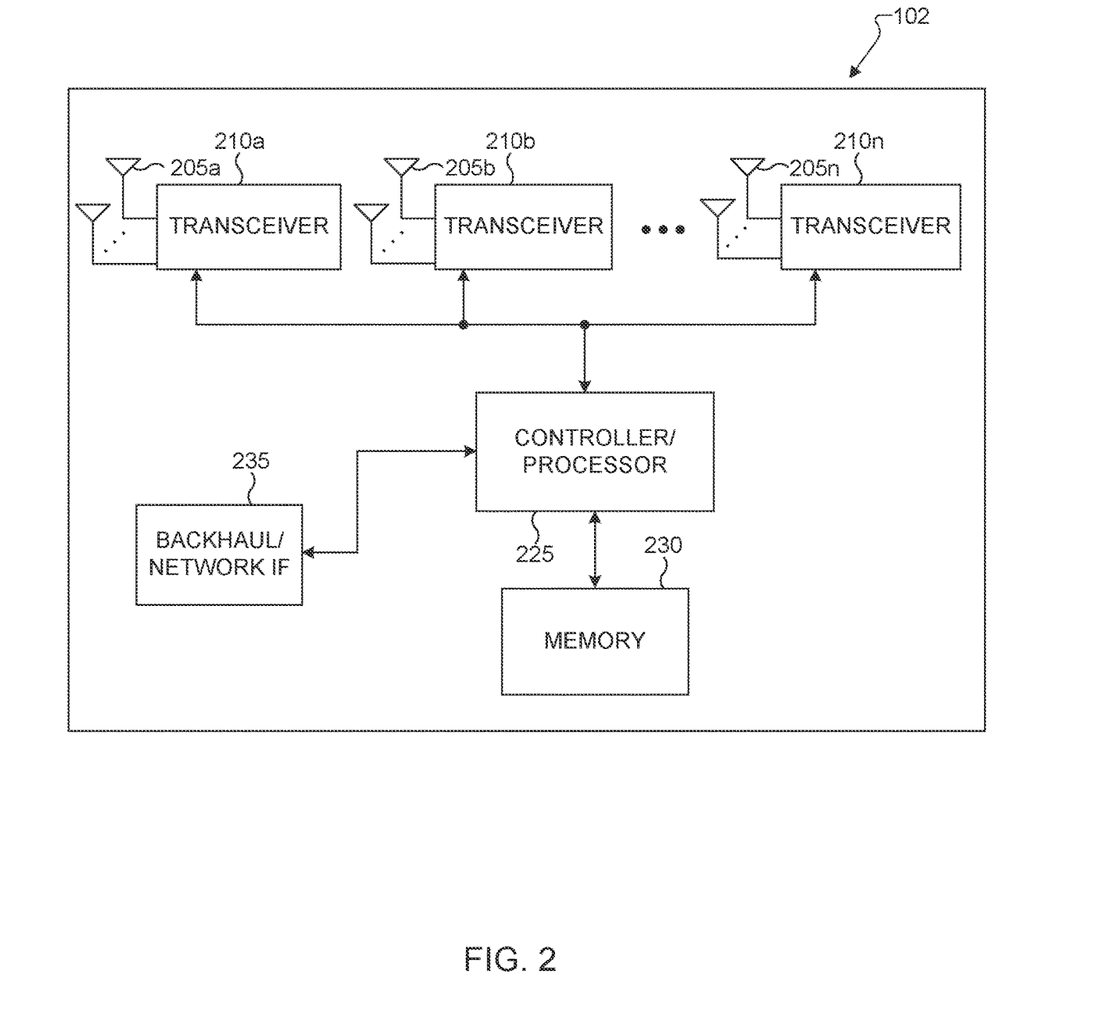
FIGS. 2 and 3 illustrate example electronic devices in accordance with an embodiment of this disclosure.
Figure 3:
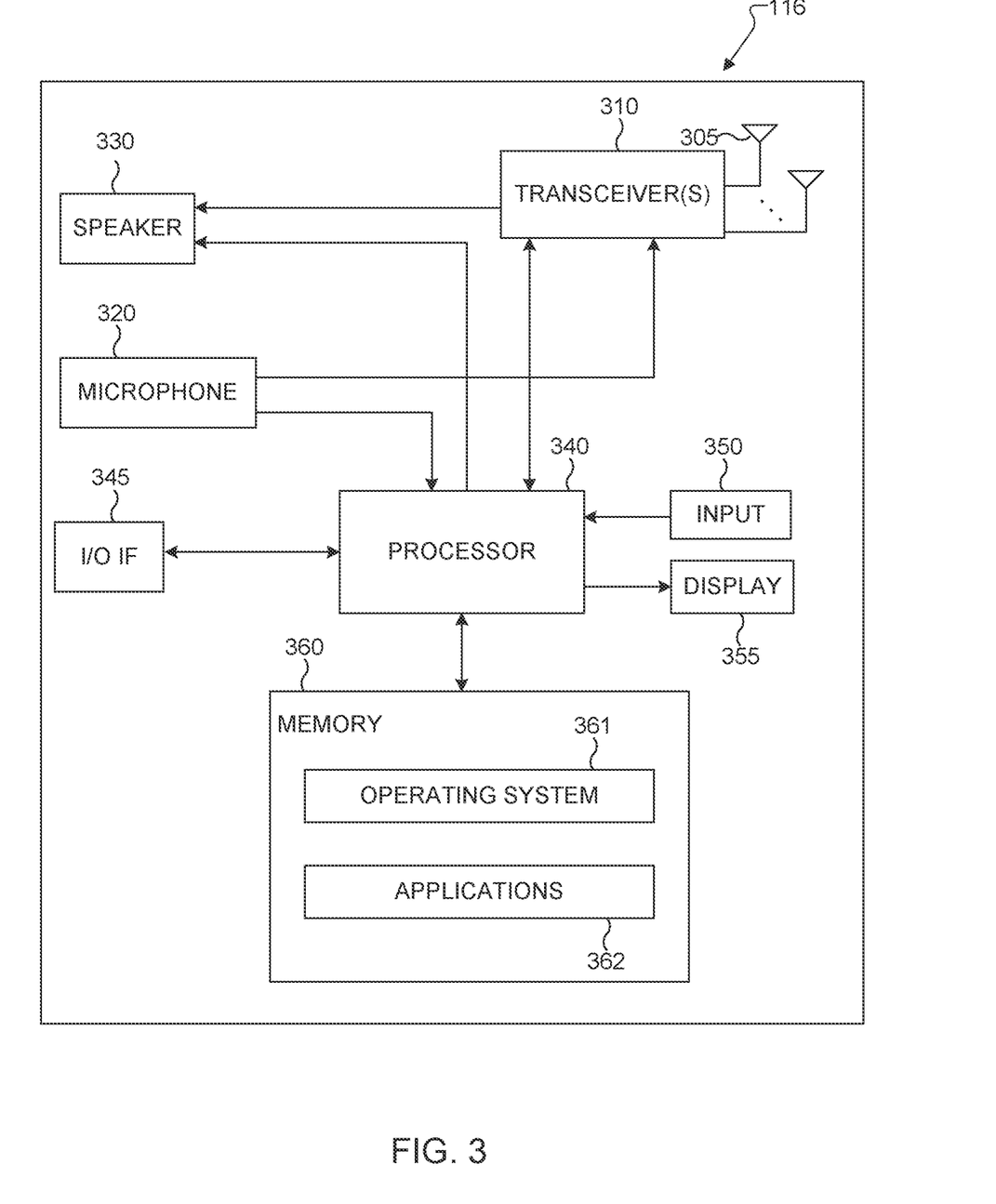

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
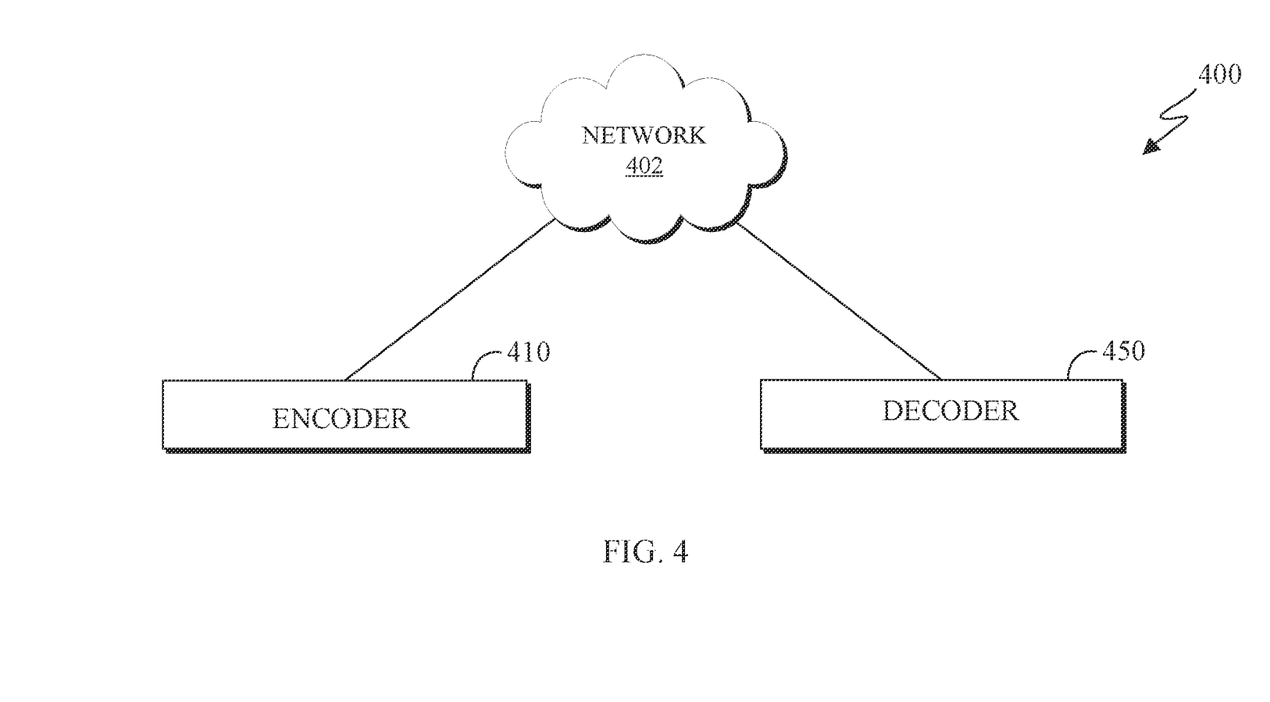
FIG. 4 illustrates a block diagram of an example environment-architecture in accordance with an embodiment of this disclosure.

FIG. 4 illustrates a block diagram of an example environment-architecture 400 in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network 402. The network 402 can be the same as or similar to the network 101 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 receives media content from another device such as a server (similar to the server 104 of FIG. 1, the server 200 of FIG. 2) or an information repository (such as a database). The encoder 410 transmits frames representing the media content as an encoded bitstream. The bitstream can be transmitted to an information repository (such as a database) or an electronic device that includes a decoder (such as the decoder 450), or the decoder 450 itself through the network 402.

Although FIG. 4 illustrates examples of an encoder and a decoder, various changes can be made to FIG. 4. For example, various components in FIG. 4 could be combined, further subdivided, or omitted and additional components could be added according to particular needs. As a particular example, the encoder 410 or decoder 450 could be divided into multiple components. In addition, as with computing and communication, encoders and decoders can come in a wide variety of configurations, and FIG. 4 does not limit this disclosure to any particular encoder or decoder.

Figure 5:
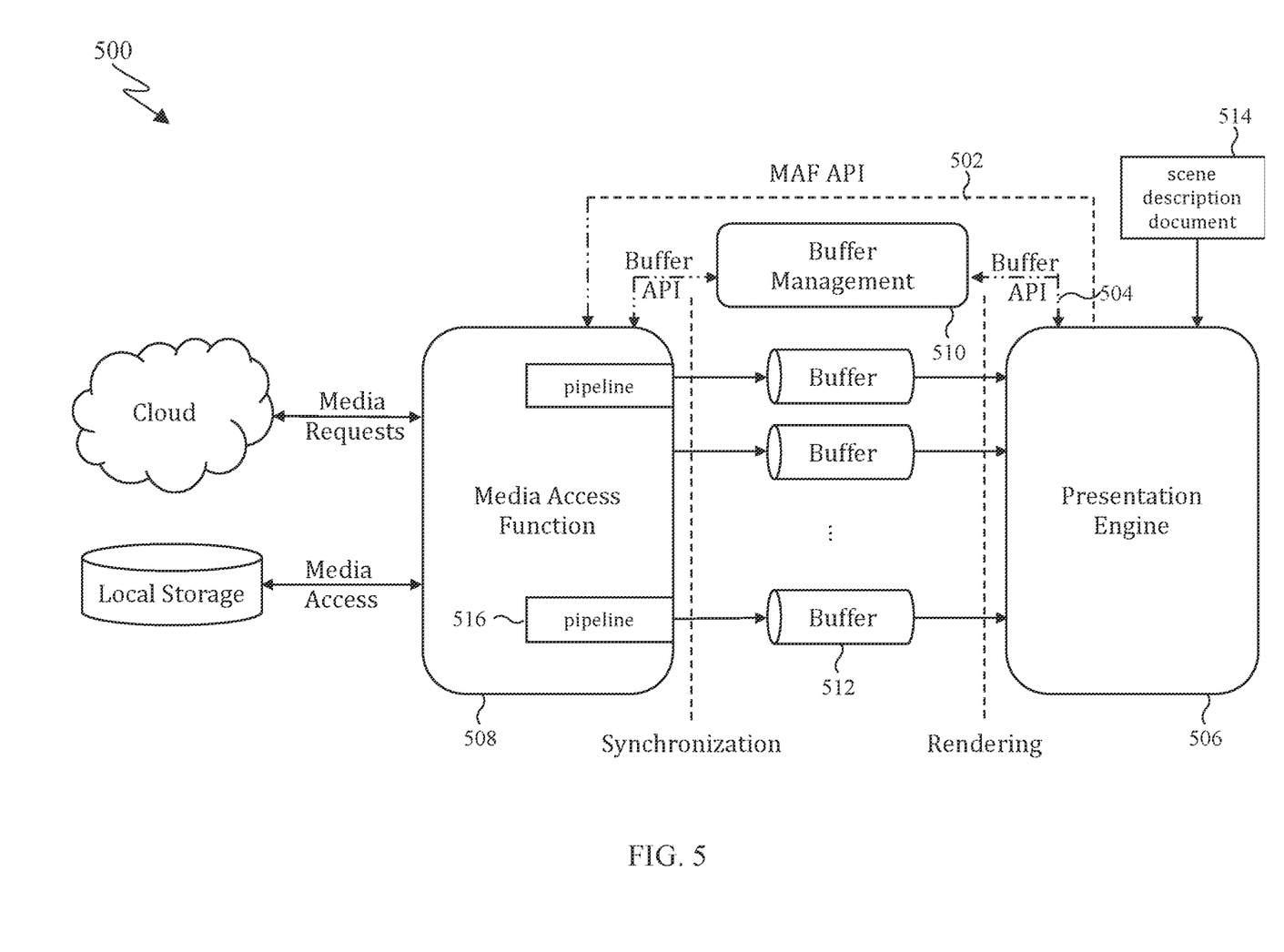
FIG. 5 illustrates an example scene description reference architecture in accordance with this disclosure.

FIG. 5 illustrates an example scene description reference architecture 500 in accordance with this disclosure. The embodiment of the scene description reference architecture 500 illustrated in FIG. 5 is for illustration only. FIG. 5 does not limit the scope of this disclosure to any particular implementation of a scene description reference architecture.

As shown in FIG. 5, the scene description reference architecture 500 can include one or more interfaces, including a media application function (MAF) application programming interface (API) 502 and a buffer API 504, and one or more components, including a presentation engine 506, an MAF 508, a buffer manager 510, and buffers 512.

The MAF API 502 can be a standardized API that is offered by any compliant MAF 508 to the presentation engine 506. The buffer API 504 is used by the presentation engine 506 and the MAF 508 to control the buffer manager 510 to allocate and control buffers 512 for exchange of data between the presentation engine 506 and the MAF 508. The presentation engine 506 can render and process content of a scene. The MAF 508 is a function that retrieves and prepares media for rendering on request by the presentation engine 506.

The scene description document 514 is consumed by a presentation engine 506 to render a 3D scene to the viewer. Scene description extensions can be designed with a goal of decoupling the presentation engine 506 from the MAF 508. The presentation engine 506 and MAF 508 can communicate through the MAF API 502, which allows the presentation engine 506 to request media data required for the rendering of a scene. The MAF 508 can retrieve the requested media and make the media available in a timely manner and in a format that can be immediately processed by the presentation engine 506. For instance, a requested media asset may be compressed and residing in the network, so the MAF 508 can retrieve and decode the asset and pass the resulting media data to the presentation engine 506 for rendering. The media data is passed in form of buffers 512 from the MAF 508 to the presentation engine 506. The requests for media data are passed through the MAF API 502 from the presentation engine 506 to the MAF 508.

The format of the buffers 512 can be provided by the scene description document 514 and can be passed to the MAF 508 through the MAF API 502. Pipelines 516 can perform necessary transformations to match a buffer format and layout declared in the scene description document 514 for a specified buffer 512. The fetching of a scene description document 514 and scene description updates can be triggered by the MAF 508.

The presentation engine 506 can receive and parse the scene description document 514 and the scene description updates. The presentation engine 506 can identify external media to be presented and can identify a required presentation time. The presentation engine 506 subsequently uses the MAF API 502 to request the media by provides the scene description information. The scene description information can include where the MAF 508 can find the requested media, what parts of the media and at what level of detail, when the requested media has to be made available, a format for the data and how the data is passed to the presentation engine 506, etc.

The MAF 508 can instantiate the media fetching and decoding pipeline 516 for the requested media at the appropriate time. The MAF 508 can ensure that the requested media is available at the appropriate time in the appropriate buffers 512 for access by the presentation engine 506. The MAF 508 can ensure that the media is decoded and reformatted to match the format expected by the presentation engine 506 as described by the scene description document 514.

The exchange of data (media and metadata) can be performed through buffers 512, including circular and static buffers. The buffer manager 510 can be controlled through the buffer API 504. Each buffer 512 can contain header information to describe the content and timing. The presentation engine 506 can provide the MAF 508 with information to select an appropriate source for the media (multiple medias could be specified) and the MAF 508 may select the source of the media based on preferences and capabilities. Capabilities may include, for example, decoding capabilities or supported formats. Preferences may include, for example, user settings.

The presentation engine 506 can provide the MAF 508 with information for each selected source accessing the media by using a media access protocol and setup the media pipeline 516 to provide the information in the correct buffer format.

The MAF 508 can query or obtain additional information from the presentation engine 506 in order to optimize the delivery of the media. For example, the required quality for each of the buffers, the exact timing information, etc. can be queried or obtained by the MAF 508.

The MAF 508 can setup and manage a pipeline 516 for each requested media or metadata. A pipeline 516 can take one or more media or metadata tracks as input and one or more buffers as outputs. The pipeline 516 can perform all the necessary processing, such as streaming, demultiplexing, decoding, decryption, and format conversion to match the expected buffer format. The final buffer 512 or set of buffers 512 can be used to exchange data with the presentation engine 506.

A track with samples containing glTF JSON documents and JSON patch document can be stored as metadata media defined in ISO/IEC 14496-12 and can fulfil certain conditions. A first condition can be that a 'meta' handler type can be used in the HandlerBox of the MediaBox. Another condition can be that a sample entry format of 'mett' and a mime_format field can be set to model/gltf+json, a content_encoding field, when present, can contain either an empty string or a value allowed in HTTP's Content-Encoding header, and a GLTFPatchConfigBox field can be present in the sample entry. An additional condition can include samples containing glTF JSON documents can be marked as a sync sample and shall use UTF-8 encoding, as defined in IETF RFC 8259. A condition can be that samples containing JSON patch documents may not be marked as sync sample and can use UTF-8 encoding, as defined in IETF RFC 8259. A condition can be that samples may have a sample_has_redundancy flag set to 1, in which case processing is applied.

A presentation time of a sample identifies a scene activation time for a scene resulting from loading a glTF JSON document or resulting from applying the JSON patch document contained in the sample as indicated by update_mode in the GLTFPatchConfigBox to the active scene description document. In certain embodiments, an ISOBMFF file track carrying scene description data can have more than one sync sample and each sync sample containing a glTF JSON document that defines the status of the nodes at the presentation time of the sync sample. When no samples have been processed before a current sync sample, the presentation engine 506 can process the current sync sample as a normal scene description document 514. When any samples have been processed before the current sync sample, the presentation engine 506 can process the current sync sample as a scene update even though the scene description document 514 in the sample is not in the form of a JSON patch.

Although FIG. 5 illustrates an example scene description reference architecture 500, various changes may be made to FIG. 5. For example, the scene description reference architecture 500 may be used in any other suitable media processing and is not limited to the specific embodiments described above.

Figure 6:
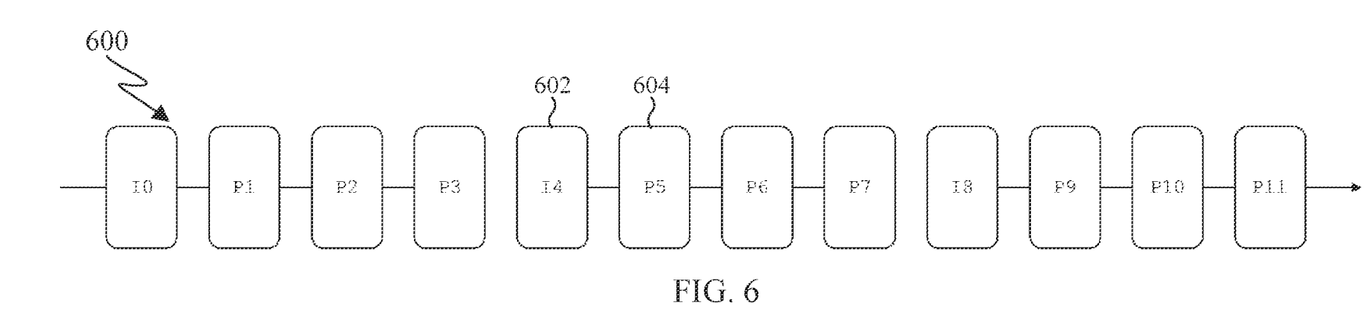
FIG. 6 illustrates an example structure of a file track including a video bitstream in accordance with this disclosure.

FIG. 6 illustrates an example structure of a file track 600 including a video bitstream in accordance with this disclosure. The embodiment of the file track 600 illustrated in FIG. 6 is for illustration only. FIG. 6 does not limit the scope of this disclosure to any particular implementation of a file track.

As shown in FIG. 6, samples denoted with the character "I" are sync samples 602 containing intra-coded video frames and the samples denoted with the character "P" are non-sync samples 604 containing inter-coded video frames. The number for a sample denotes a decoding/presentation order of the respective samples. For example, when the bitstream is played at sync sample 18, both a client already started playback of the bitstream before a sync sample 18 and a client starting playback of the bitstream from a sync sample 18 can decode and present the sync sample 18 in a same manner. Both clients can decode and present the sync sample 18 the same because the sync sample 18 is intra-coded data that does not use decoded data from any previous sample before the sync sample 18. In addition, decoder 450, having already started playback, does not preserve a previous status of the decoder 450 with the exception of some configuration information applied to an entire bitstream and fully refreshes the status of the decoder 450, so there is no continuity of the decoder status.

Although FIG. 6 illustrates an example structure of a file track 600 for a video bitstream, various changes may be made to FIG. 6. For example, more or less than three non-sync samples 604 may be include after each sync sample 602 in the file track 600.

Figure 7:
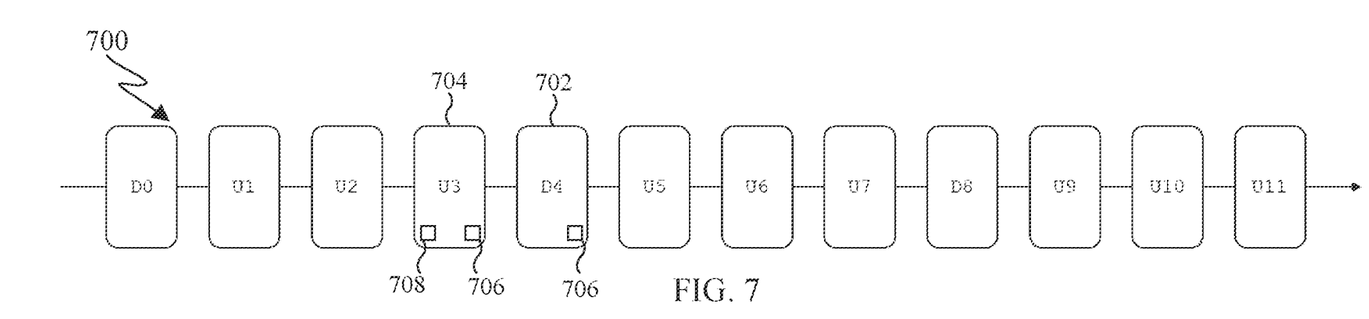
FIG. 7 illustrates an example structure of a file track including scene description data in accordance with this disclosure.

FIG. 7 illustrates an example structure of a file track 700 including scene description data in accordance with this disclosure. The embodiment of the file track 700 illustrated in FIG. 7 is for illustration only. FIG. 7 does not limit the scope of this disclosure to any particular implementation of a file track.

As shown in FIG. 7, sync samples 702 and non-sync samples 704 of file track 700 need to be processed differently as a presentation engine 506 already processing a scene description document 514 and external media may need to preserve a status of the presentation engine 506, buffers 512, and pipelines 516, while the presentation engine 506 is processing a sync sample for efficient processing and continuous presentation.

The samples denoted with the character "D" are sync samples 702 containing a scene description document 706 and the samples denoted with the character "U" are non-sync samples 704 containing either a scene description document 706 or a scene description update 708. The numbers in the samples can indicate a decoder order of the samples. For example, the presentation engine 506 starting playback from the D8 sample need to fully process the sample, e.g., create a scene graph and request the media. However, a presentation engine 506 having already processed data before the D8 sample does not have to fully refresh a current active scene already processed but can update the status of the current active scene up according to the D8 sample. In addition, the buffers 512 and pipelines 516 for external media can be continuously running without any interruption while processing the D8 sample. glTF JSON documents can be marked as sync samples and usage of redundant samples for random access.

The scene description document 514 can be consumed by a presentation engine 506 to render a 3D scene to the viewer. The extensions defined in this document allow for creation of immersive experiences using timed data. The scene description extensions can be designed with a goal of decoupling the presentation engine 506 from the MAF 508. The presentation engine 506 and MAF 508 can communicate through the MAF API 502, which can allow the presentation engine 506 to request media data required for the rendering of the scene. The MAF 508 can retrieve the requested media and make the requested media available in a timely manner and in a format that can be immediately processed by the presentation engine 506. For instance, a requested media asset may be compressed and residing in the network, so the MAF 508 can retrieve and decode the asset and pass the resulting media data to the presentation engine 506 for rendering. The media data can be passed in the form of buffers 512 from the MAF 508 to the presentation engine. The requests for media data are passed through the MAF API 502 from the presentation engine 506 to the MAF 508.

Although FIG. 7 illustrates an example structure of a file track 700 including scene description data, various changes may be made to FIG. 7. For example, more or less than three non-sync samples 704 may be include after each sync sample 702 in the file track 700.

Figure 8:
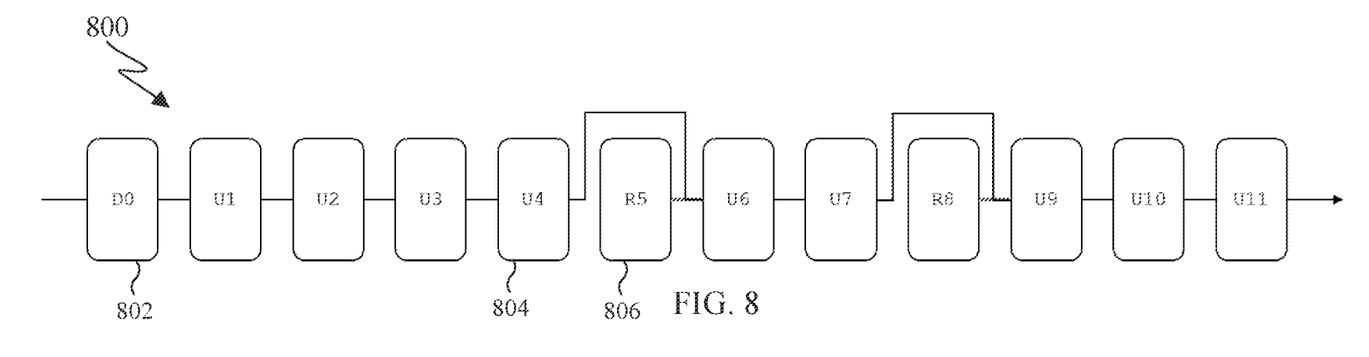
FIG. 8 illustrates an example structure of a file track including scene description data with shadow sync samples in accordance with this disclosure.

FIG. 8 illustrates an example structure of a file track 800 including scene description data with shadow sync samples in accordance with this disclosure. The embodiment of the file track 800 illustrated in FIG. 8 is for illustration only. FIG. 8 does not limit the scope of this disclosure to any particular implementation of a file track.

When no nodes in the currently active scene of the presentation engine 506 matches a node in a scene description document 514 from a sync sample 802, the presentation engine 506 can add such a node and interact with the MAF 508 to fetch any new content associated with the scene update. When a node in the currently active scene of the presentation engine 506 does not match any nodes in a scene description document 514 from a sync sample 802, the nodes missing from the scene description document 514 can be removed from a currently active scene of the presentation engine 506. When a node in the currently active scene of the presentation engine 506 matches a node in a scene description document 514 from a sync sample 802, then a status of such node can be updated to the status of the node described by the sync sample 802.

In certain embodiments, a scene description data in a file track 800 can contain some non-sync samples 804 that have a sample_has_redundancy flag set to 1. The scene description document 514 in such samples can have the description of a scene the same as the scene at the composition time of that sample. When starting to present content from a beginning of a track, the presentation engine 506 can start to play the first sync sample in the file track 800. When playing content from the middle of a file track 800, the presentation engine 506 can start play from a redundant sample 806 and continue with non-sync samples 804 after the redundant sample 806 in decoding order in the file track 800.

As shown in FIG. 8, file track 800 with scene description data has two redundant samples 806 denoted with the character "R". The redundant sample R8 whose composition time is between the U7 sample and the U9 sample can contains a scene description document 514 containing description of the scene at the time of the composition time of the R8 sample. The presentation engine 506 can start from the middle of the file track 800 by starting to play either the R5 sample or the R8 sample, then play the U6 sample or the U9 sample, respectively. The Presentation Engine 506 starting from the beginning of the file track 800 starts play at the D0 sample and ignores or skips the R5 sample and the R8 sample. As the sample duration of the U4 sample and the U7 sample can be extended by a sample duration of the R5 sample and the R8 sample, respectively. The scene description information in the U4 sample and the U7 sample can consider that the presentation engine 506 can play these samples longer than a sample duration of the respective samples. For example, the animation of an active scene of the presentation engine 506 according to the animation samplers provided by the U4 sample and the samples before that sample may continue until the presentation engine 506 receives any updated animation samplers by the U6 sample or the samples after that sample.

For all defined tracks, if a non-sync sample 804 has a sample_has_redundancy flag set to '1' and a sample_depends_on flag set to '2', then the sample contains a scene description document describing a status of the scene at the composition time of that sample and would be made available by the ISOBMFF parser to the presentation engine 506 if the processing of the track starts with this sample. Otherwise, the sample can be ignored, and that processing of the current sample is continued beyond the duration of current sample for a duration equal to the duration of the ignored sample, as defined in ISO/IEC 14496-12. If the scene description preceding the sample is ignored, then the presentation engine 506 can continue play of the currently active scene until the presentation engine 506 receives any updates from the next samples after the ignored sample. Therefore, the scene description in the sample immediately preceding the sample in decoding order whose sample_has_redundancy flag is set to '1' and sample_depends_on flag is set to '2' can consider that the presentation engine 506 plays the scene beyond the duration of that sample by the amount of the duration of the next sample. In addition, the scene description document 514 in the sample whose sample_has_redundancy flag is set to '1' and sample_depends_on flag is set to '2' may not introduce any scene description that make a status of an active scene of a presentation engine 506 different from the status of the active scene of a presentation engine 506 played immediately preceding this sample during the time between the composition time of this sample and the composition time of immediately succeeding sample.

In certain embodiments, the scene description data track can contain only one sync sample as a first or initial sample in the decoding order and all subsequent samples after that can be non-sync samples. Some non-sync samples that have their sample_has_redundancy flag set to '1' and sample_depends_on flag set to '2' contain a scene description document 514 describing the status of the scene at the composition time of that sample. When starting to present the content from the beginning of the file track 800, the presentation engine 506 can start to play the first sync sample 802 in the file track 800. When starting to play from the middle of the track, the presentation engine 506 can start play from the redundant samples 806 and then the presentation engine 506 continues play with non-sync samples 804 after that sample in decoding order in the file track 800.

Although FIG. 8 illustrates an example structure of a file track 800 including scene description data with shadow sync samples, various changes may be made to FIG. 8. For example, an amount non-sync samples 804 may be include after each redundant sync sample 806 in the file track 800.

Figure 9:
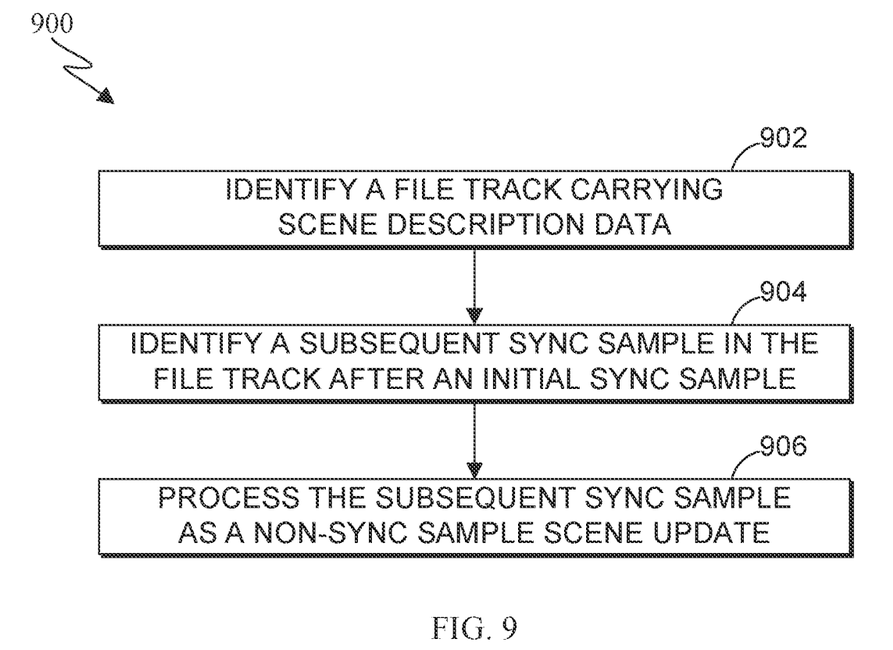
FIG. 9 illustrates an example method for random access of scene description in ISOBMFF files in accordance with this disclosure.

FIG. 9 illustrates an example method for random access of scene description in ISOBMFF files in accordance with this disclosure. For ease of explanation, the method 900 of FIG. 9 is described as being performed using the decoder 450 of FIG. 4. However, the method 900 may be used with any other suitable system and any other suitable electronic device.

As shown in FIG. 9, the decoder 450 can identify a file track carrying scene description data at step 902. The scene description data can be found in a scene description document 514. A presentation engine 506 of the decoder 450 can present a scene to a user based on the scene description data. A file track can be received by the decoder 450 and one or more samples can be identified regarding a scene being presented by the presentation engine 506. The samples can contain scene description documents 514.

The decoder 450 can identify a subsequent sync sample in the file track after an initial sync sample at step 904. A file track can contain a plurality of samples that are arranged in a presentation order. Each sample can be identified based on the presentation time of a scene. For example, at three second of the presentation of the scene, the decoder 450 can identify a sample corresponding to the third second in the file track. The subsequent sync sample includes a scene description that defines a status of nodes at a presentation time of a sync sample. In certain embodiments, the scene description is not in a form of a JSON patch.

The decoder 450 can process the subsequent sync sample as a non-sync sample scene update at step 906. As new scene description data is received, the presentation engine 506 can update the scene according to the nodes in the new scene description data. When a currently active scene does not include a node stored in the subsequent sync sample, the decoder 450 can add the node and request new content as part of the non-sync sample scene update. When a currently active scene includes a node not stored in the subsequent sync sample, the decoder 450 can remove the node from the currently active scene. When a currently active scene includes a node that corresponds to a node stored in the subsequent sync sample, the decoder 450 can update a status of the node in the currently active scene to a status of the nodes stored in the subsequent sync sample.

The decoder 450 can identify a non-sync sample with a sample_has_redundancy flag indicating that the non-sync sample is a redundant sample. When the redundant sample is identifies, the decoder can extend a duration of a sample that occurs immediately preceding the redundant sample.

Although FIG. 9 illustrates an example method for random access of scene description in ISOBMFF files, various changes may be made to FIG. 9. For example, while shown as a series of steps, various steps in FIG. 9 may overlap, occur in parallel, or occur any number of times.

Figure 10:
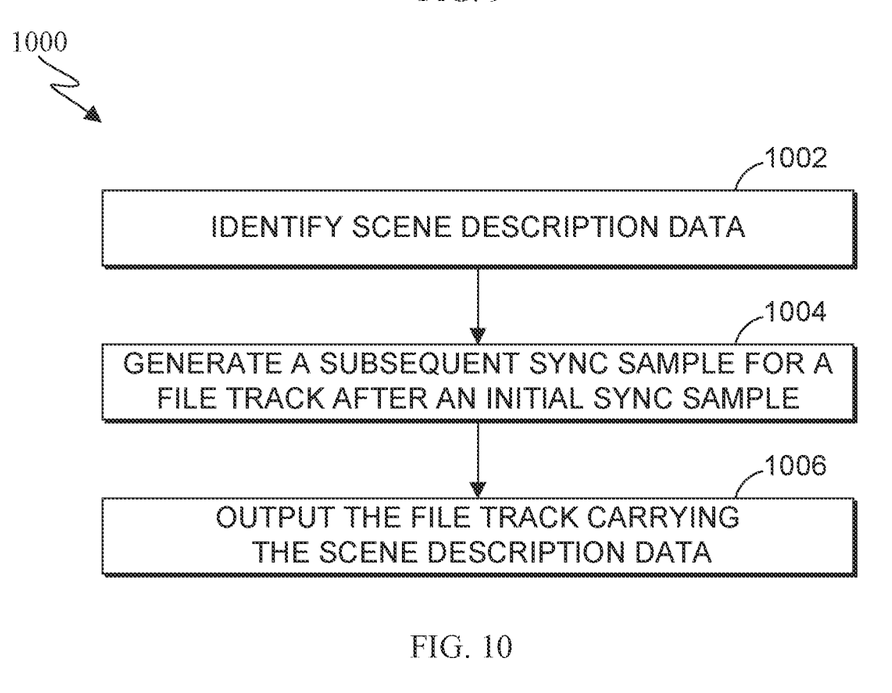
FIG. 10 illustrates an example method for random access of scene description ISOBMFF files in accordance with this disclosure.

FIG. 10 illustrates an example method for random access of scene description ISOBMFF files in accordance with this disclosure. For ease of explanation, the method 1000 of FIG. 10 is described as being performed using the encoder 410 of FIG. 4. However, the method 1000 may be used with any other suitable system and any other suitable electronic device.

As shown in FIG. 10, the encoder 410 can identify scene description data at step 1002. The scene description data can be found in a scene description document 514. The scene description data can be found in a scene description document 514. A file track can be encoded by the encoder 410 and one or more samples can be encoded regarding a scene to be presented by the presentation engine 506. The samples can contain scene description documents 514.

The encoder 410 can generate a subsequent sync sample for a file track after an initial sync sample at step 1004. A file track can contain a plurality of samples that are arranged in a presentation order. Each sample can be identified based on the presentation time of a scene. For example, at three second of the presentation of the scene, the encoder 410 can encode a sample corresponding to the third second in the file track. The subsequent sync sample includes a scene description that defines a status of nodes at a presentation time of a sync sample. In certain embodiments, the scene description is not in a form of a JSON patch.

When a node is to be added to a scene, the encoder 410 can encode or store the node in the subsequent sync sample. When a node is to be removed from a scene, the encoder 410 can omit the node in the subsequent sync sample. The encoder 410 can identify a non-sync sample as a redundant sample. When the redundant sample is identified, the encoder 410 can set a sample_has_redundancy flag to indicate that the non-sync sample is the redundant sample.

The encoder 410 can output the file track carrying scene description data at step 1006. The file track can be received by a decoder 450 and presented to a user by a presentation engine 506.

Although FIG. 10 illustrates an example method for random access of scene description ISOBMFF files, various changes may be made to FIG. 10. For example, while shown as a series of steps, various steps in FIG. 10 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
memory; and
a processor operably coupled to the memory, the processor configured to:
identify a file track carrying scene description data and including a plurality of non-sync samples;
identify a subsequent sync sample in the file track after an initial sync sample, wherein the initial sync sample includes a first scene description that defines a first full status of nodes at a presentation time of the initial sync sample, wherein the subsequent sync sample includes a second scene description that defines a second full status of nodes at a presentation time of the subsequent sync sample, and wherein the second scene description included in the subsequent sync sample used to update the first scene description is not in a form of a JavaScript object notation (JSON) patch; and
update the first scene description by processing the subsequent sync sample that includes the second scene description as a non-sync sample scene update.

2. The apparatus of claim 1, wherein the processor is further configured to, when a currently active scene does not include a node stored in the subsequent sync sample, add the node and request new content as part of the non-sync sample scene update.

3. The apparatus of claim 1, wherein the processor is further configured to, when a currently active scene includes a node not stored in the subsequent sync sample, remove the node from the currently active scene.

4. The apparatus of claim 1, wherein the processor is further configured to, when a currently active scene includes a node that corresponds to a node stored in the subsequent sync sample, update a status of the node in the currently active scene to a status of the nodes stored in the subsequent sync sample.

5. The apparatus of claim 1, wherein the processor is further configured to:
identify a non-sync sample with a sample_has_redundancy flag indicating that the non-sync sample is a redundant sample; and
extend a duration of a sample that occurs immediately preceding the redundant sample.

6. The apparatus of claim 1, wherein the second scene description included in the subsequent sync sample used to update the first scene description is in a form of a graphics language transmission format (glTF) JSON document.

7. A method for processing files, the method comprising:
identifying a file track carrying scene description data and including a plurality of non-sync samples;
identifying a subsequent sync sample in the file track after an initial sync sample, wherein the initial sync sample includes a first scene description that defines a first full status of nodes at a presentation time of the initial sync sample, wherein the subsequent sync sample includes a second scene description that defines a second full status of nodes at a presentation time of the subsequent sync sample, and wherein the second scene description included in the subsequent sync sample used to update the first scene description is not in a form of a JavaScript object notation (JSON) patch; and
updating the first scene description by processing the subsequent sync sample that includes the second scene description as a non-sync sample scene update.

8. The method of claim 7, further comprising:
when a currently active scene does not include a node stored in the subsequent sync sample, adding the node and request new content as part of the non-sync sample scene update.

9. The method of claim 7, further comprising:
when a currently active scene includes a node not stored in the subsequent sync sample, removing the node from the currently active scene.

10. The method of claim 7, further comprising:
when a currently active scene includes a node that corresponds to a node stored in the subsequent sync sample, updating a status of the node in the currently active scene to a status of the nodes stored in the subsequent sync sample.

11. The method of claim 7, further comprising:
identifying a non-sync sample with a sample_has_redundancy flag indicating that the non-sync sample is a redundant sample; and
extending a duration of a sample that occurs immediately preceding the redundant sample.

12. The method of claim 7, wherein the second scene description included in the subsequent sync sample used to update the first scene description is in a form of a graphics language transmission format (glTF) JSON document.

13. An apparatus comprising:
memory; and
a processor operably coupled to the memory, the processor configured to:
identify scene description data;
generate a subsequent sync sample for a file track after an initial sync sample wherein the initial sync sample includes a first scene description that defines a first full status of nodes at a presentation time of the initial sync sample, wherein the subsequent sync sample includes a second scene description that defines a second full status of nodes at a presentation time of the subsequent sync sample, wherein the second scene description included in the subsequent sync sample used to update the first scene description is not in a form of a JavaScript object notation (JSON) patch, and wherein the subsequent sync sample is generated as a non-sync sample scene update for updating the first scene description by processing the subsequent sync sample that includes the second scene description as a non-sync sample scene update; and
output the file track carrying the scene description data.

14. The apparatus of claim 13, wherein the processor is further configured to, when a node is to be added to a scene, store the node in the subsequent sync sample.

15. The apparatus of claim 13, wherein the processor is further configured to, when a node is to be removed from a scene, omit the node in the subsequent sync sample.

16. The apparatus of claim 13, wherein the processor is further configured to:
identify a non-sync sample as a redundant sample; and
set a sample_has_redundancy flag to indicate that the non-sync sample is the redundant sample.

17. The apparatus of claim 13, wherein the second scene description included in the subsequent sync sample used to update the first scene description is in a form of a graphics language transmission format (glTF) JSON document.

\* \* \* \* \*